United States Patent
Mochizuki et al.

[11] Patent Number: 5,609,537
[45] Date of Patent: Mar. 11, 1997

[54] PLANETARY GEAR AUTOMATIC TRANSMISSION

[75] Inventors: Nobuaki Mochizuki; Yoshimi Iwaya, both of Isehara, Japan

[73] Assignee: Nissan Motor Co., Ltd., Kanagawa-ken, Japan

[21] Appl. No.: 576,356

[22] Filed: Dec. 21, 1995

[30] Foreign Application Priority Data

Dec. 26, 1994 [JP] Japan ..................... 6-323334

[51] Int. Cl.⁶ ........................................ F16H 3/56
[52] U.S. Cl. ........................... 475/144; 475/285
[58] Field of Search ..................... 475/144, 285

[56] References Cited

U.S. PATENT DOCUMENTS

| | | | |
|---|---|---|---|
| 3,863,524 | 2/1975 | Mori et al. | 475/285 |
| 4,864,892 | 9/1989 | Ando et al. | 475/144 |
| 4,938,096 | 7/1990 | Takahashi et al. | 475/285 |
| 4,944,719 | 7/1990 | Takahashi et al. | 475/285 |
| 5,478,291 | 12/1995 | Morisawa et al. | 475/144 |

FOREIGN PATENT DOCUMENTS

| | | |
|---|---|---|
| 58-207556 | 12/1983 | Japan . |
| 64-85844 | 3/1989 | Japan . |

*Primary Examiner*—Dirk Wright
*Attorney, Agent, or Firm*—Lowe, Price, LeBlanc & Becker

[57] ABSTRACT

An automatic transmission is provided with a gear train comprising a plurality of rotation elements for selecting one of a preset plurality of gear ratios between an input shaft and an output shaft. Further provided is a one way clutch which prevents rotation of a specific rotation element in one direction. By decreasing the acceleration of this rotation element in the reverse direction when there is a gear change such that the rotation direction of the element changes to reverse, acceleration of the element in the reverse direction is suppressed to a small value when the one way clutch prevents reverse rotation of the element, and impact due to stopping reverse rotation is thereby damped.

4 Claims, 4 Drawing Sheets

5,609,537

PLANETARY GEAR AUTOMATIC TRANSMISSION

FIELD OF THE INVENTION

This invention relates to a control unit for controlling an automatic transmission having a planetary gear train.

BACKGROUND OF THE INVENTION

In automatic transmissions for transmitting engine power to a drive shaft via a hydraulic clutch such as a torque converter and planetary gear train, a one-way clutch comprising an overrunning clutch may for example be used. In this type of transmission, for example, a low gear ratio may be obtained when the one-way clutch restricts the rotation of one rotation element in the planetary gear train, and a high gear ratio may be obtained when the rotation element rotates in another direction which the one-way clutch allows.

In this case, when the gear ratio is changed over from high speed to low speed, the rotation direction of the rotation element changes when a load acts upon it in the opposite direction, and the one-way clutch which so far had permitted rotation of the element prevents its rotation in the reverse direction. If the rotation element and the one-way clutch collide, a severe shock may occur.

To suppress this shock, Tokkai Sho 58-207556 published by the Japanese Patent Office in 1983 and Tokkai Sho 64-85844 published by the Japanese Patent Office in 1989, disclose a method wherein an engine ignition period is delayed when there is such a gear shift so that a torque input to the converter is temporarily reduced.

However, torque suppression by retarding engine ignition timing cannot be employed when the engine running conditions are such that it is difficult to retard the ignition timing, e.g. when any further delay of the ignition timing would result in impairment of exhaust gas composition or combustion conditions.

Further in this type of controller, signal exchanges take place between a control system of the automatic transmission and that of the engine, and this requires complex hardware and software. It is also difficult to match component elements of hardware, and the cost of the controller therefore increases.

SUMMARY OF THE INVENTION

It is therefore an object of this invention to damp a gear shift shock when there is a change-over to low speed in a planetary gear automatic transmission without performing engine control such as delaying the ignition timing.

It is a further object of this invention to perform suitable shock damping depending on engine running conditions when there is a gear shift.

It is yet a further object of this invention to complete a gear shift rapidly while damping shocks.

In order to achieve the above objects, this invention provides a planetary gear automatic transmission comprising an input shaft, output shaft and gear train comprising a plurality of rotation elements which select a plurality of set gear ratios between the shafts. The transmission further comprises a one way clutch that allows a specific rotation element in the gear train to rotate in a forward direction, and prevents the element from rotating in a reverse direction, and a mechanism for reducing an acceleration of the rotation element in the reverse direction when there is a gear shift such that the rotation of the predetermined rotation element changes from the forward direction to the reverse direction.

This invention also provides a planetary gear automatic transmission comprising a first planetary gear train and a second planetary gear train. The first planetary gear train comprises a first sun gear, a first planetary pinion gear that rotates due to engaging with the first sun gear, a first planetary carrier that supports the first planetary pinion gear such that it is free to revolve around the sun gear, a first ring gear that engages with the first planetary pinion gear and is supported free to rotated coaxially with the first sun gear, an input shaft so formed that it is free to rotate relative to the first gear train, and an output shaft connected to the first ring gear. The second planetary gear train comprises a second sun gear connected to the input shaft, a second planetary pinion gear that rotates due to engaging with the second sun gear, a second planetary carrier that supports the second planetary pinion gear such that it is free to revolve around the sun gear, the carrier being connected to the output shaft, and a second ring gear that engages with the second planetary pinion gear and is supported free to rotate coaxially with the second sun gear. The transmission further comprises a mechanism for connecting the first planetary carrier and the second ring gear, a clutch connecting the first planetary carrier to the input shaft, a band brake for braking the first sun gear, a one-way clutch for preventing rotation of the first planetary carrier in a first direction which is opposite to a direction in which the input shaft rotates, and a mechanism for operating the band brake for a predetermined period when a first gear position wherein the first planetary carrier is rotating in a second direction opposite to the first direction has been shifted to a second gear position wherein a torque acts on the first planetary carrier in the first direction, immediately before the one-way clutch prevents the planetary carrier from rotating in the first direction.

It is preferable that the band brake operating mechanism comprises an electromagnetic valve that variably controls a braking force of the band brake according to a ratio of opening time and closing time of the valve.

It is further preferable that the input shaft Is connected to a driven shaft of a hydraulic transmission unit comprising a drive shaft and the driven shaft, and the transmission operates the band brake operating mechanism when a ratio of rotation speeds of the drive shaft and the driven shaft reaches a predetermined value.

The details as well as other features and advantages of this invention are set forth in the remainder of the specification and are shown in the accompanying drawings.

DESCRIPTION OF THE PREFERRED EMBODIMENTS

Figure 1:
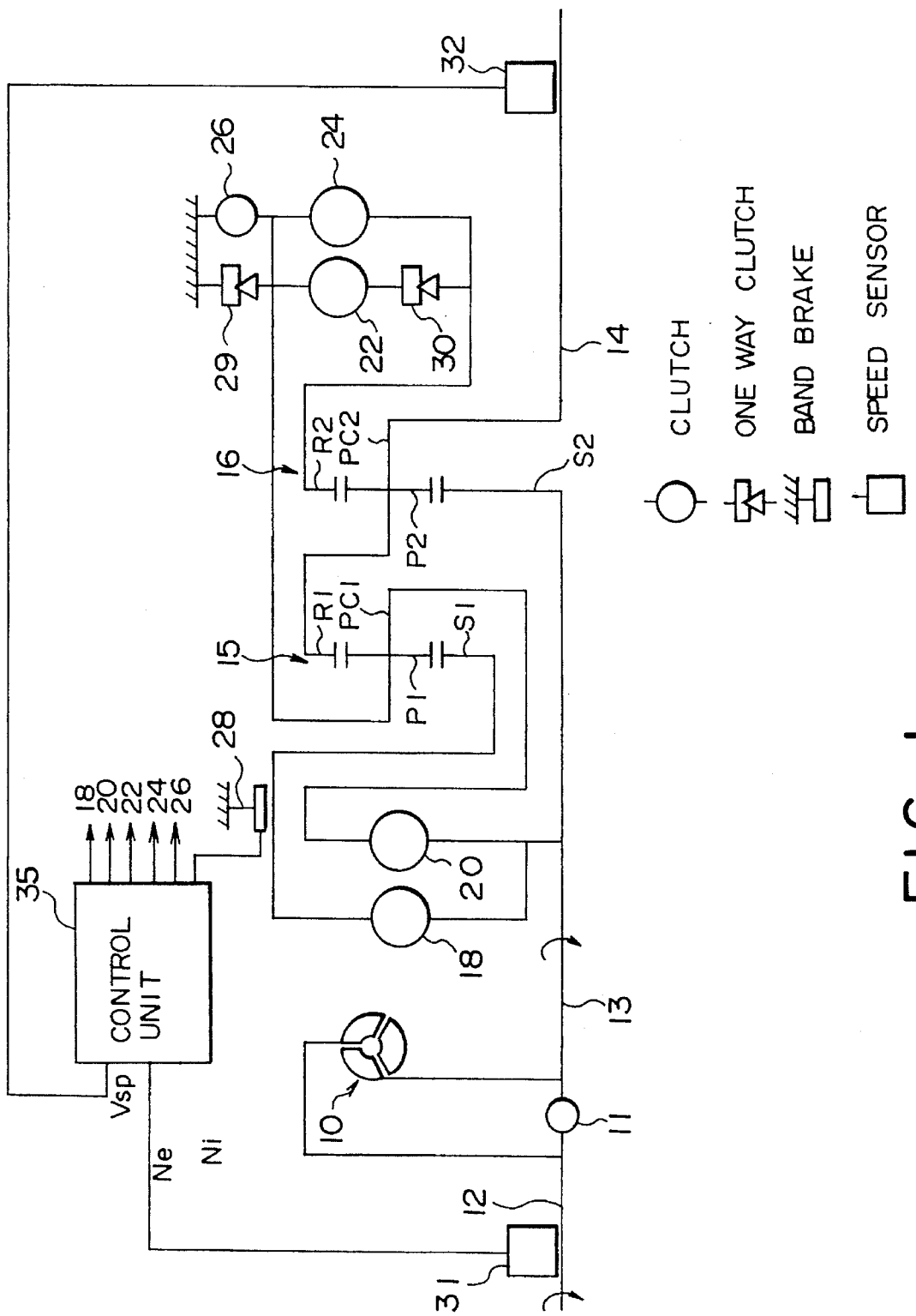
FIG. 1 is a schematic diagram of an automatic transmission to which this invention is applied.

Referring to FIG. 1 of the drawings, an automatic transmission which selectively applies four forward speeds and one reverse speed comprises an input shaft 13 and output shaft 14. The rotational force of an engine output shaft 12 is transmitted to the input shaft 13 via a torque converter 10. The output shaft 14 outputs a drive force to a wheel drive shaft, not shown. The torque converter 10 comprises a built-in lock-up clutch 11.

The automatic transmission comprises a compound planetary gear set, comprising a first planetary gear train 15 and a second planetary gear train 16, provided between the input shaft 13 and output shaft 14. Friction units for driving or locking the gears of the compound planetary gear set comprise a reverse clutch 18, high clutch 20, forward clutch 22, overrunning clutch 24, low and reverse brake 26, band brake 28, low one-way clutch 29 and forward one-way clutch 30.

The first planetary gear train 15 comprises a sun gear S1, ring gear R1 and a plurality of planetary pinion gears P1 that fit between the gears S1, R1. The planetary pinion gears P1 are mounted on a planetary carrier PC1.

Likewise, the second planetary gear train 16 comprises a sun gear S2, ring gear R2, planetary pinion gear P2 and planetary carrier PC2.

The planetary carrier PC1 is connected to the input shaft 13 via the high clutch 20, and the sun gear S1 is connected to the input gear via the reverse clutch 18.

The planetary carrier PC1 is connected to the ring gear R2 via the forward clutch 22 and one-way clutch 30 directly connected in series with the clutch 22. It may alternatively be connected to the ring gear R2 via the overrunning clutch 24 connected in parallel with the clutches 22 and 30.

The sun gear S2 is connected to the input shaft 13. The ring gear R1 and planetary carrier PC2 are both connected to the output shaft 14.

The low and reverse brake 26 restricts the planetary carrier PC1, and the band brake 28 restricts the sun gear S1.

The low one-way clutch 29 comprises for example an overrunning clutch which allows forward rotation of the planetary gear PC1 and ring gear R2, i.e. it allows the rotation of PC1 and R2 in the direction of the rotation of the input shaft 13 but prevents their rotation in the reverse direction.

In this automatic transmission, the way in which the component elements (S1, S2, P1, P2, R1, R2, PC1, PC2) of the planetary gear trains 15, 16 rotate is varied by operating the mechanism with predetermined combinations of the clutches 18, 20, 22, 24, and the brakes 26, 28, so as to vary the rotation speed of the output shaft 14 with respect to the rotation speed of the input shaft 13, i.e. the gear ratio, and the rotation direction of the shaft 14.

This operation is performed by controlling a hydraulic pressure supplied to these clutches and brakes. For this purpose, the clutches and brakes are provided with electromagnetic valves, not shown, these valves being opened and shut according to electronic signals output by a control unit 35.

The control unit 35 selects a gear ratio In accordance with a preset map based on an engine speed Ne and a vehicle speed Vsp, and changes over the gears of the automatic transmission by outputting signals to the electromagnetic valves. In order to obtain the engine speed Ne and vehicle speed Vsp, a sensor 31 detecting the rotation speed of the engine output shaft 12 and a sensor 32 detecting the rotation speed of the output shaft 14 of the transmission are respectively provided.

A typical mode will now be described wherein drive force is transmitted from the engine to the vehicle drive wheels when the automatic transmission is switched through a D range, i.e. from first to fourth forward gears.

In the following description, $\alpha_1$ and $\alpha_2$ represent the step-down ratios respectively for the planetary gear trains 15 and 16.

$$\alpha_1 = \frac{\text{no. of teeth in } S1}{\text{no. of teeth in } R1} \qquad \alpha_2 = \frac{\text{no. of teeth in } S2}{\text{no. of teeth in } R2}$$

When the vehicle is moving forward, the forward clutch 22 is always connected while the reverse clutch 18, overrunning clutch 24 and low and reverse brake 26 are always disconnected regardless of the gear ratio.

In first gear, only the forward clutch 22 is connected, the other components used in forward motion, i.e. the high clutch 20 and band brake 28, being disconnected.

The rotation of the input shaft 13 is transmitted from the sun gear S2 to the output shaft 14 via the planetary pinion gear P2 and planetary carrier PC2. A drive reaction from the output shaft 14 then acts on the planetary carrier PC2. With this reaction, the planetary pinion gear P2 attempts to rotate the ring gear R2 in the reverse direction. However, this reverse rotation is prevented by the low one-way clutch 29, so the planetary pinion gear P2 receiving the rotational force of the sun gear S2 inside the ring gear R2, makes the planetary carrier PC2 drive the output shaft 14 in the forward direction against the reaction. The gear ratio is then expressed by the following equation:

$$\text{Gear ratio} = \frac{(1 + \alpha_2)}{\alpha_2}$$

When the gear is changed over from first gear to second gear, the band brake 28 restricts the rotation of the sun gear S1. The planetary carrier PC1 and the ring gear R2 connected to it via the forward clutch 22 therefore rotate in the same direction as the input shaft 13. As a result, the rotation speed of the planetary carrier PC2 having the planetary pinion gear R2 mounted between the ring gear R2 and sun gear S2, and of the output shaft 14 directly connected to the planetary carrier PC2, is faster than first gear. The gear ratio is then expressed by the relation:

$$\text{Gear ratio} = \frac{(\alpha_1 + \alpha_2 + \alpha_1 \cdot \alpha_2)}{\alpha_2 \cdot (1 + \alpha_1)}$$

When there is a change from second gear to third gear, the restriction of the sun gear S1 by the band brake 28 is released, the high clutch 20 is connected, and the planetary carrier PC1 is thereby connected to the input shaft 13. As the planetary carrier PC1 is connected to the ring gear R2 via the forward clutch 20 and the sun gear S2 is joined to the input shaft 13, the sun gear S2, ring gear R2 and planetary carrier PC2 form a one-piece construction so that the whole of the second planetary gear train 16 rotates. In other words, in third gear, the input shaft 13 and output shaft 14 are directly connected. The gear ratio is then 1.

When the gear changes from third gear to fourth gear, the band brake 28 again operates so as to restrict rotation of the sun gear S1 with the high clutch 20 still connected. The planetary carrier PC1 therefore rotates at the same speed as the input shaft 13 around the sun gear S1 which is fixed, while the ring gear R1 that engages with the planetary pinion gear P1 mounted on the planetary carrier PC1 and the planetary carrier PC2 that is directly connected to the ring gear R1 cause the output shaft to rotate at a higher speed than the planetary carrier PC1. The gear ratio is then expressed by the following ratio:

$$\text{Gear ratio} = \frac{1}{(1 + \alpha_2)}$$

Gear control during forward motion of the vehicle when drive force is transmitted from the engine to the drive shaft is performed mainly by selectively operating the high clutch 20 and band brake 28.

The automatic transmission performs gear control either electronically or hydraulically according to the running conditions such as vehicle speed or load so as to obtain a suitable gear speed for those conditions.

The mechanical construction and operation of this automatic transmission is already known from the aforesaid prior art Tokkai Sho 64-85884.

In the aforesaid gear change-over operation, as is clear by comparing first gear, second gear and higher gears, the reverse stop function due to the low one-way clutch 29 operates only in first gear, while in second and later gears the planetary carrier PC1 rotates in the forward direction so the reverse stop does not function. In other words, when there is a change-over from second or higher gear to first gear due to increase of required load or kickdown during acceleration, a load in the reverse rotation direction acts on the planetary carrier PC1 which until then had been rotating in the forward direction. When this reverse rotation is prevented by the low one-way clutch 29, an impact occurs.

This impact can be damped by reducing the engine drive torque input to the input shaft 13, however this problem arises during gear change-over when engine output control is performed.

This invention resolves this problem by controlling the braking of a rotating element of which the reverse rotation is prevented by means of the one-way clutch.

In second or higher gears, the high clutch 20 is engaged, or the band brake 28 is operating and the ring gear R2 is rotating forwards. When shifting to first gear from this situation, both the high clutch 20 and band brake 28 are released and the low one-way clutch 29 prevents reverse rotation of the ring gear R2.

According to this invention, the band brake 28 is operated in a limited mode for a limited predetermined time before the low one-way clutch 29 starts preventing the reverse rotation of the ring gear R2. From the signal outputs to the electromagnetic valves, the controller 35 detects the current gear position and determines that there has been a shift from second gear to first gear.

Figure 2:
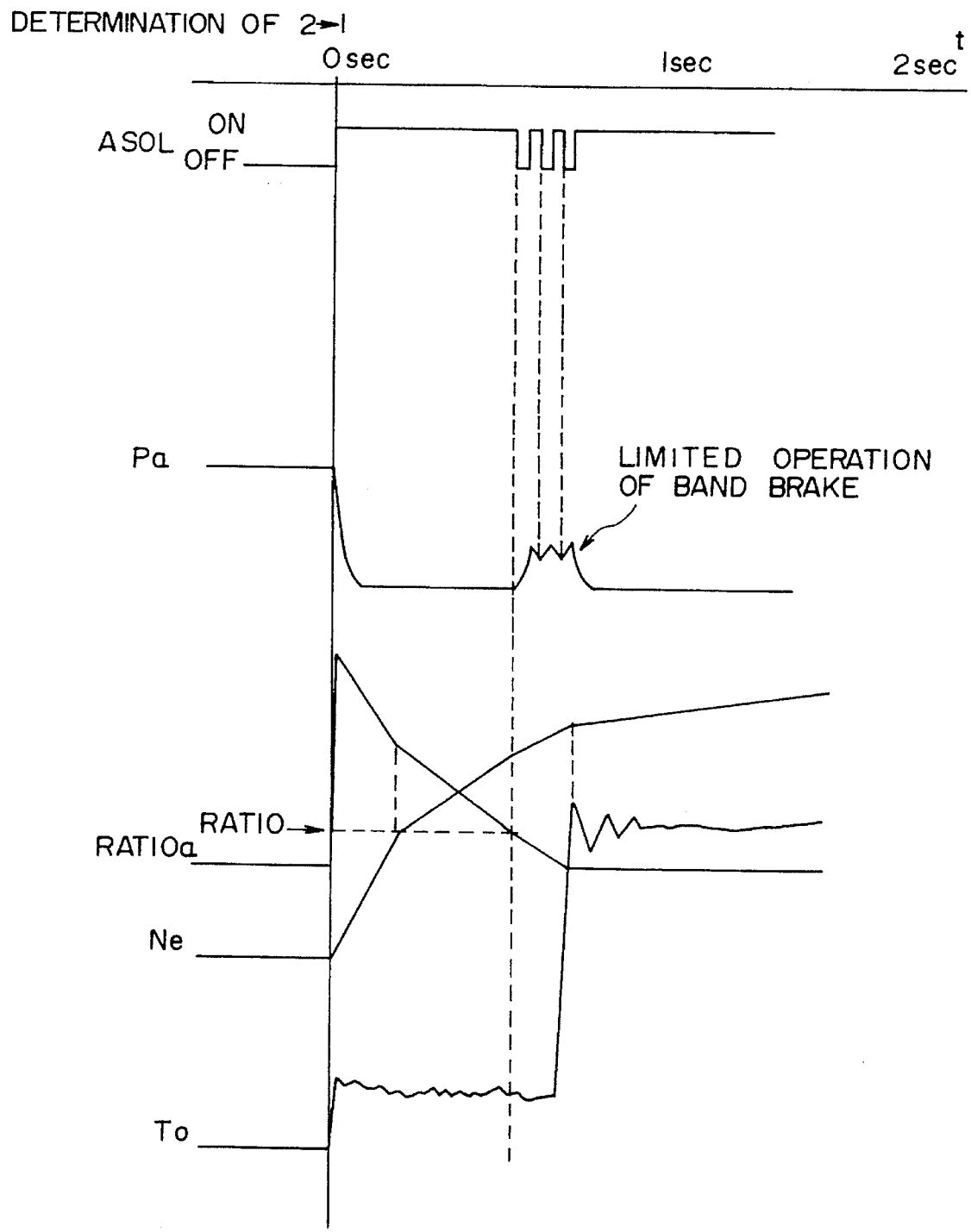
FIG. 2 is a timing chart showing a control flow with time according to this invention.
Figure 3:
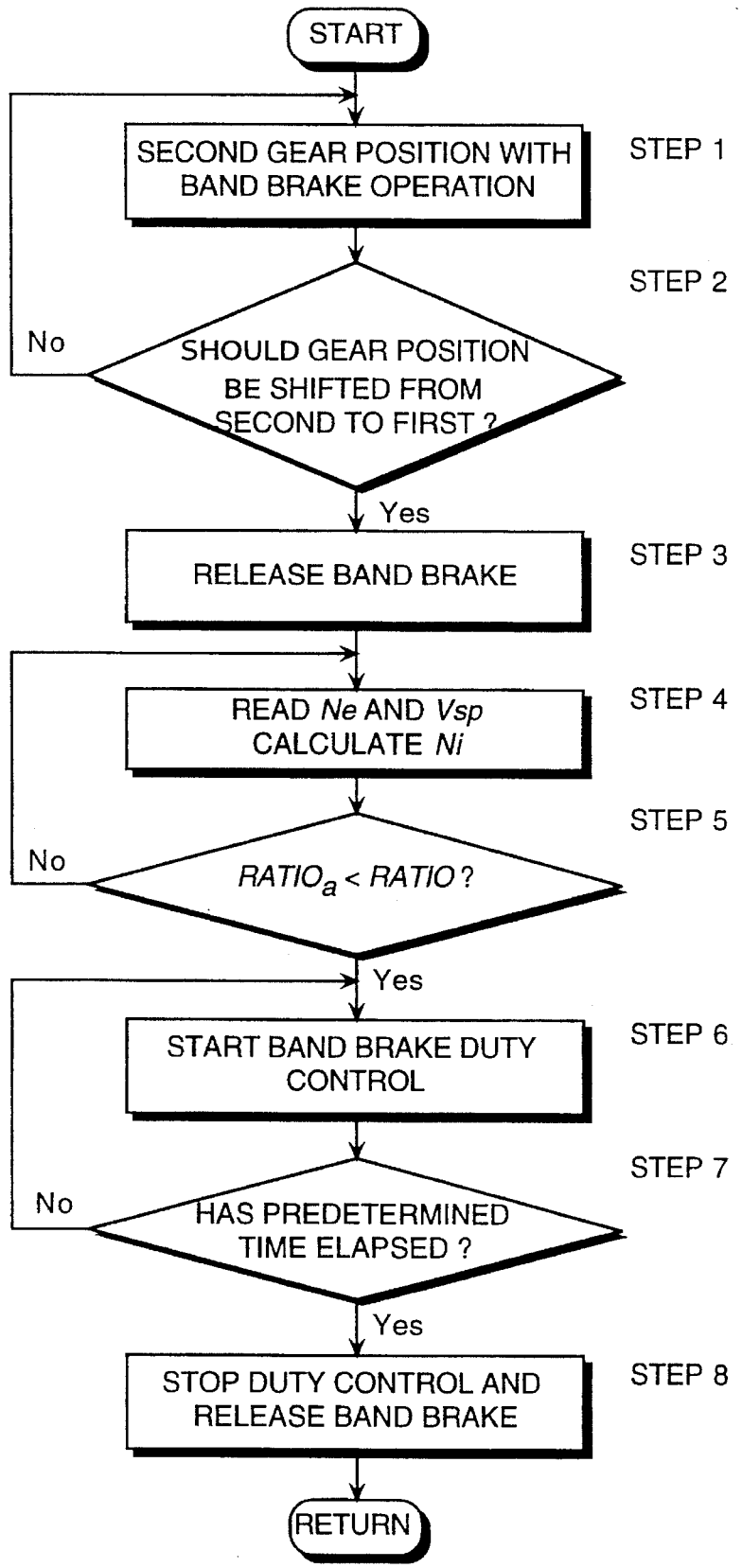
FIG. 3 is a flowchart describing a band brake control algorithm according to this invention.

FIG. 2 is a timing chart showing a result of control of the band brake 28 when there is a change-over from second gear to first gear, and FIG. 3 is a flowchart showing the control process.

In FIG. 2, ASOL is a signal for opening and closing an electromagnetic valve attached to the band brake 28. When this signal is OFF, a hydraulic pressure Pa is supplied to the band brake 28, and when the signal is ON, the pressure is released. Ne is an engine speed, and To is a torque of the output shaft 14. RATIO and $\text{RATIO}_a$ will be described hereinafter.

When it is determined in a step 2 of FIG. 3 that there should be a gear shift to first gear from second gear shown in a step 1, the control unit 35 switches to the aforesaid first gear. In other words, as shown in a step 3, the ASOL signal goes ON and the hydraulic pressure supplied to the band brake 28 is released.

The ring gear R2 which has been rotating in the same direction as the input shaft 13, begins to decelerate due to the reaction caused by the load of the output shaft 14 which is transferred via the planetary gear PC1 and planet pinion gear P2, and eventually attempts to rotate in the reverse direction.

Before this attempt, a predetermined duty control of ASOL is performed so as to open and close the electromagnetic valve, and hydraulic pressure is supplied to the band brake 28 to such an extent that the sun gear S1 does not stop. As this causes a torque in a forward direction to be input to the ring gear R2 via the planetary carrier PC1 and ring gear R1, the acceleration of the ring gear R2 in the reverse direction decreases, and as a result, the acceleration of the ring gear R2 when the low one-way clutch 29 functions to stop its reverse direction is also decreased. The engine speed also varies smoothly during this period. Hence, by operating the band brake 28 in a limited manner, gear shock due to stopping reverse rotation of the low one-way clutch is damped.

The limited action of the band brake 28 due to electromagnetic valve duty control may be performed from the beginning of gear change, but from the viewpoint of shortening gear change-over time to first gear, it is preferable to perform it after a predetermined time has elapsed from start of gear change-over to coincide with the time when reverse rotation of the ring gear R2 starts to be prevented. According to this embodiment, this start time is determined by RATIO.

Figure 4:
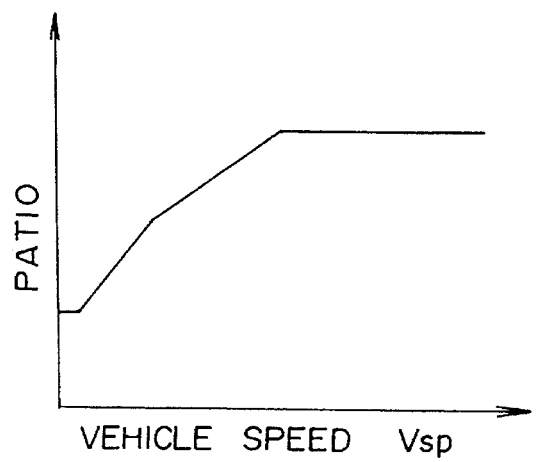
FIG. 4 is a map specifying a relation of a vehicle speed Vsp to a rotation speed ratio RATIO between an input/output shaft of a torque converter.

RATIO is a ratio of the rotation speeds of input and output shafts of the torque converter 10, i.e. of the engine output shaft 12 and input shaft 13 of FIG. 1, and when it has reached a certain value depending on the vehicle speed, it has a correlation which makes the low one way clutch 29 start to engage. As shown in FIG. 4, referring to a map where the magnitude of RATIO is assigned depending on the vehicle speed Vsp, duty control of the electromagnetic valve of the band brake 28 is begin when RATIO is compared with a measured value $\text{RATIO}_a$, and there is a change-over from $\text{RATIO}_a > \text{RATIO}$ to $\text{RATIO}_a < \text{RATIO}$. A band brake capacity is thereby assigned to coincide with the time when the low one way clutch 29 is actually connected, and gear change can therefore be completed in a short time while gear change shock is damped. In a step 4 of FIG. 3, the engine speed Ne and vehicle speed Vsp are read. Since the current gear position is known, the current gear ratio is also known, The control unit 35 then calculates an estimated rotation speed Ni of the input shaft 13 of the transmission from the vehicle speed Vsp and the current gear ratio. In a step 5, the measured $\text{RATIO}_a = Ni/Ne$ is compared with the RATIO in the map, and it is determined whether or not it is time to start duty control of the electromagnetic valve of the band brake 28.

If a sensor for detecting the rotation speed of the input shaft 13 is further provided, the start time of the duty control of the electromagnetic valve may be determined without using the rotation speed ratio of the torque converter 10. In this case, the duty control of the electromagnetic valve may be started when the actual rotation speed of the input shaft 13 has reached a certain fraction, e.g. 90%, of the rotation speed of the input shaft 13 after gear change computed from the vehicle speed and gear ratio after gear change.

In a step 6, duty control of the electromagnetic valve of the band brake 28 begins so as to operate the band brake 28 in a limited manner. In a step 7, it is determined whether or not duty control for a predetermined period has been completed. If this predetermined period has elapsed, ASOL goes ON in a step 8, and the band brake 28 is released.

Figure 5:
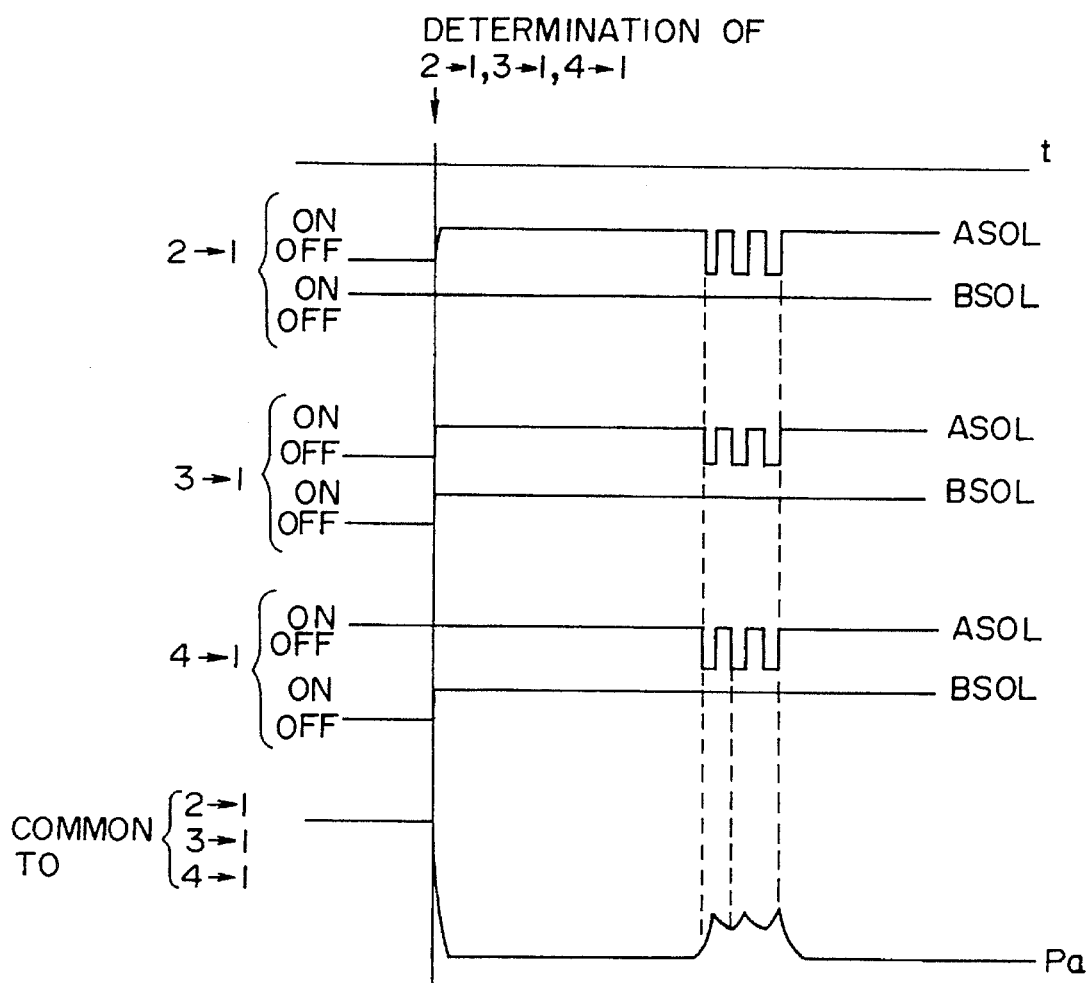
FIG. 5 is a timing chart showing a control flow with time according to another/embodiment of this invention.

In the aforesaid description, the case was described where there was a downshift from second gear to first gear, but the same band brake control is performed when there is a shift from third or fourth gear to first gear. FIG. 5 shows a timing chart for such a case. In this Figure, BSOL is an open/close signal for the off pressure control valve which operates the high clutch 20, the high clutch 20 being released when it is ON and engaged when it is OFF.

The embodiments of this invention in which an exclusive property or privilege is claimed are defined as follows:

1. A planetary gear automatic transmission comprising an input shaft, output shaft and gear train comprising a plurality of rotation elements which select a plurality of set gear ratios between said shafts, further comprising:

a one way clutch that allows a specific rotation element in said gear train to rotate in a forward direction, and prevents said element from rotating in a reverse direction, and means for reducing an acceleration of said rotation element in said reverse direction when there is a gear shift such that the rotation of said predetermined rotation element changes from said forward direction to said reverse direction.

2. A planetary gear automatic transmission comprising:

a first planetary gear train comprising a first sun gear, a first planetary pinion gear that rotates due to engaging with said first sun gear, a first planetary carrier that supports said first planetary pinion gear such that said first planetary pinion gear is free to revolve around said sun gear, a first ring gear that engages with said first planetary pinion gear and is supported free to rotated coaxially with said first sun gear, an input shaft so formed that said input shaft is free to rotate relative to said first gear train, and an output shaft connected to said first ring gear, a second planetary gear tram comprising a second sun gear connected to said input shaft, a second planetary pinion gear that rotates due to engaging with said second sun gear, a second planetary carrier that supports said second planetary pinion gear such that said second planetary pinion gear is free to revolve around said sun gear, said carrier being connected to said output shaft, and a second ring gear that engages with said second planetary pinion gear and is supported free to rotate coaxially with said second sun gear, means for connecting said first planetary carrier and said second ring gear, a clutch connecting said first planetary carrier to said input shaft, a band brake for braking said first sun gear, a one-way clutch for preventing rotation of said first planetary carrier in a first direction, said first direction being opposite to a direction in which said input shaft rotates, and means for operating said band brake for a predetermined period when a first gear position wherein said first planetary carrier is rotating in a second direction opposite to said first direction has been shifted to a second gear position wherein a torque acts on said first planetary carrier in said first direction, immediately before said one-way clutch prevents said planetary carrier from rotating in said first direction.

3. A planetary gear automatic transmission as defined in claim 2, wherein said band brake operating means comprises an electromagnetic valve that variably controls a braking force of said band brake according to a ratio of opening time and closing time of said valve.

4. A planetary gear automatic transmission as defined in claim 3, wherein said input shaft is connected to a driven shaft of a hydraulic transmission unit comprising a drive shaft and said driven shaft, and said transmission operates said band brake operating means when a ratio of rotation speeds of said drive shaft and said driven shaft reaches a predetermined value.

* * * * *